ize*United States Patent* [19]

Knurr et al.

[11] 3,916,228

[45] Oct. 28, 1975

[54] HOUSING FOR A FRACTIONAL HORSEPOWER AC MOTOR

[75] Inventors: Friedrich Knurr, Nurnberg; Ernst Gebhard, Oberferrieden, both of Germany

[73] Assignee: Siemens Aktiengesellschaft, Munich, Germany

[22] Filed: Aug. 8, 1974

[21] Appl. No.: 495,818

[30] Foreign Application Priority Data

Aug. 9, 1973 Germany............................ 2340426

[52] U.S. Cl................................... 310/42; 310/257
[51] Int. Cl.² ........................................ H02K 15/02
[58] Field of Search...... 310/254, 257, 42, 216–218, 310/40, 44; 29/596

[56] References Cited
UNITED STATES PATENTS 2,487,180  11/1949  Rawlings............................ 310/254
2,512,848  6/1950  Brouwer.............................. 310/42

*Primary Examiner*—Donovan F. Duggan
*Attorney, Agent, or Firm*—Kenyon & Kenyon Reilly Carr & Chapin

[57] ABSTRACT

An improved housing for fractional horsepower AC motor in which the housing is made of two housing halves which can be fitted together, each of the housing halves having tabs bent perpendicular to the plane thereof with the tabs so arranged and designed that their latteral edges are pressed against each other when the housing halves are fitted together thereby making it possible for the housing to be compressed to the desired height during the fitting operation.

7 Claims, 4 Drawing Figures

HOUSING FOR A FRACTIONAL HORSEPOWER AC MOTOR

BACKGROUND OF THE INVENTION

This invention relates to fractional horsepower motors in general and more particularly to an improved housing construction for such motors.

Housings comprising two halves of the same diameter which can be fitted together, each half containing poles forming a pole system for the AC motor are disclosed in German Auslegeschrift No. 1,438,521. The two housing halves of this prior art housing overlap at their joint. This is accomplished in the disclosed design by providing the one housing half with a shoulder pointing outward and the other half with a shoulder pointing inward. Because of the close fit of the joint, it is difficult to fit such housing halves to each other. In addition, centering devices must be provided on both halves for angular centering of the two pole systems contained thereon relative to each other.

In view of these difficulties in construction, it is the object of the present invention to provide a housing for a fractional horsepower AC motor which permits the two housing halves to be fitted together easily and which does not require a special centering device for the angular centering of the two pole systems.

SUMMARY OF THE INVENTION

The present invention solves this problem by providing two housing ends which have tabs perpendicular to the plane thereof with at least one tab of the housing halve assuming a predetermined position relative to the pole system of the respective housing half.

In accordance with the present invention, the two housing halves can be joined together in a simple manner by providing tabs having bosses which engage into corresponding recesses in the other housing half. Alternatively the housing halves can be arranged so that the lateral edges of the tabs press against each other at least in part when fitting the housing halves together. Due to the fact that the length of the tabs are shorter than the axial height of the housing, the dimensional accuracy of the housing height becomes independent of the accurary of the individual heights of the housing halves.

A particularly solid connection of the two housing halves is obtained according to one embodiment of the invention, by providing alternate wide and narrow tabs with the wide tabs having a slot therein to receive the corresponding narrow tabs of the other housing half. In accordance with this embodiment of the invention, fitting the two housing halves together is facilitated by having the slot wider at the base of the tab so that it is easier to spread apart the tab portions on each side of the slot. This not only makes it easier to slide the corresponding tab of the other housing half into the slot but permits manufacturing tolerances in the width of the tabs themselves. Because the tabs of the two housing halves are slid into each other, it is possible to make the two housing halves completely identical, thereby reducing production costs considerably.

DETAILED DESCRIPTION OF THE PREFERRED EMBODIMENT

Figure 1:
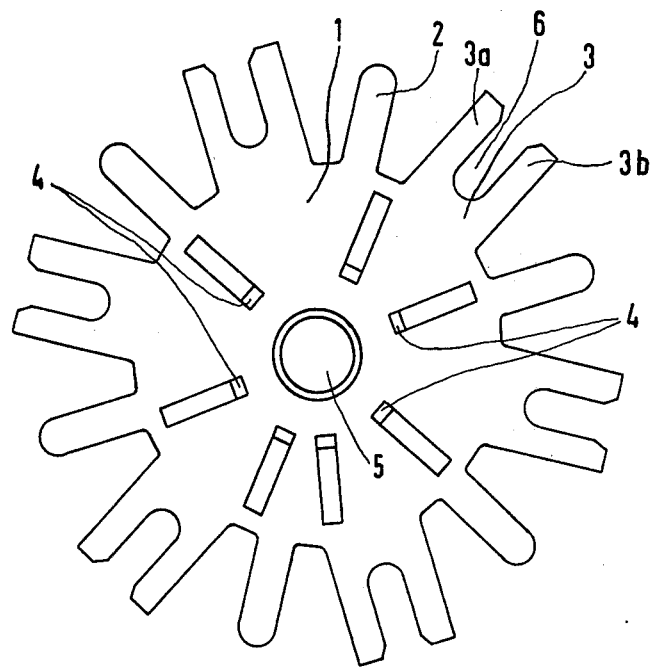
FIG. 1 is a plan view of a housing half in the form of a stamping prior to bending up of the tabs.

FIG. 1 illustrates the construction of a housing half according to the present invention. Shown is a housing half 1 which is stamped out of a flat piece of sheet metal and contains tabs 2 and 3. Prior to assembly, the tabs 2 and 3 are bent perpendicular to the plane of housing half 1 in a further operation. In well known fashion, the tabs 2 and 3 form the magnetic return path. Also shown on FIG. 1 for the sake of completeness are prong-shaped poles 4 built into each of the housing halves. These too are bent perpendicular in well known fashion. In addition, the housing half 1 has an opening 5 for the motor shaft.

As is evident from FIG. 1, the tabs 2 and 3 which alternate around a circumference of the housing half 1 are of different design. The tabs 3 are relatively wide and contain a slot 6 thereby dividing them into two arms 3a and 3b. This slot is provided to receive the narrower tabs 2 of the other housing half. The width of the slot 6 and of the tabs 2 are matched accordingly. The free ends of the tabs 2 are rounded for ease of insertion into the slot 6. Furthermore, the edges of the tabs 3 are chamfered at the mouth of the slot.

Figure 2:
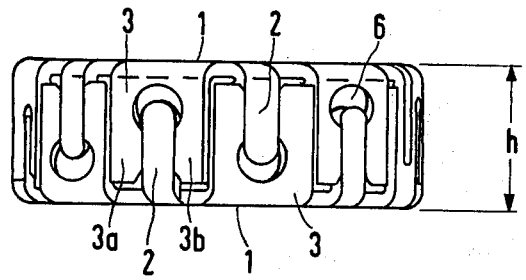
FIG. 2 is an elevation view of a housing formed of two housing halves such as those of FIG. 1.
Figure 3:
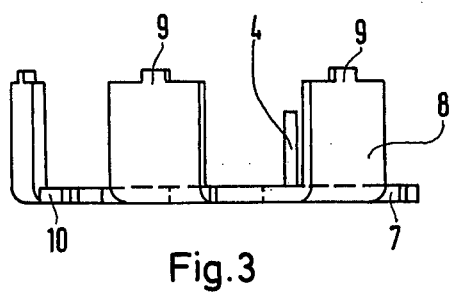
FIG. 3 is a plan view of an alternate embodiment of the housing of the present invention.

FIG. 3 shows two housing halves such as that of FIG. 1, after having their tabs bent, assembled together to form a housing. The manner in which the tabs 2 and 3 engage each other is evident from the figure. The embodiment illustrated on FIG. 2 differs slightly from that on FIG. 1 in that the slots 6 are widened at the bottom of the base of the tabs. This results in a reduction of the width of the tabs in a transverse direction at this point and thereby makes it possible to spread the arms 3a and 3b apart a slight degree. As a result, it is easier to slide the tabs 2 of the other housing half 1 into the slots 6. In addition, manufacturing deviations in the width of the tabs 2 and of the slot 6 can be compensated for by a slight spreading apart of the arms 3a and 3b.

An examination of the housing shown on Fig. 2 will also indicate that the length of the tabs 2 is shorter than the length of the slots 6. Thus, the tips of the tabs 2 do not make contact with the tabs 3 at the end of the slot. The axial height h of the housing thus depends solely on how far the tabs 2 and 3 of the housing halves 1 are slid into each other. Consequently, manufacturing deviations in the length of the slots 6 and of the tabs 2 have no effect on the accuracy of the axial housing height h.

The fitting of the tabs 2 and 3 into each other results in a relatively large contact area between the two housing halves 1 and, thus, in an extremely solid connection between the two housing halves. As a result, additional operations such as peening or riveting of the two housing halves need not be carried out.

Figure 4:
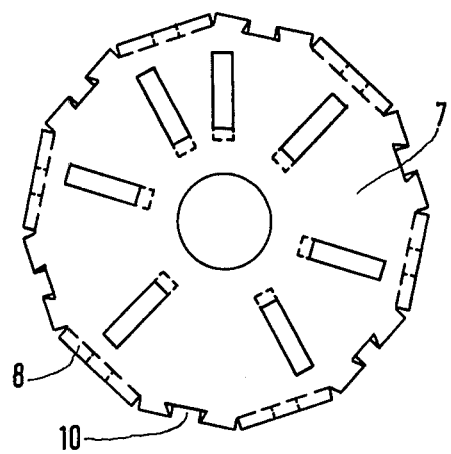
FIG. 4 is an elevation view of the housing half of FIG. 4.

FIG. 3 illustrates an alternate embodiment of the present invention. In the housing half 7 shown thereon, each of the tabs 8 bent perpendicular to the plane of the housing half 7 includes on its end a lug or boss 9. Recesses 10 are provided in each of the housing half 7 between the tabs 8. These recesses are illustrated in particular on FIG. 4. When fitting two housing halves 7 together, the lugs 9 engage with the recesses 10. If the fit between the lugs 9 and the recesses 10 is appropriately close, a solid connection of the two halves is achieved merely by the engagement of the lugs 9 and the recesses 10. The strength of the connection of the two housing halves can be further increased by riveting or peening the lugs 9.

Thus, an improved housing construction for a fractional horsepower AC motor has been shown. Although specific embodiments have been illustrated and described, it will be obvious to those skilled in the art that various modifications may be made without departing from the spirit of the invention which is intended to be limited solely by the appended claims.

What is claimed is:

1. In a housing for fractional fractiional horsepower A-C motor of the type comprising two housing halves of the same diameter which are fitted together with each housing half containing poles, forming a pole system for the A-C motor, an improved form of construction, comprising a plurality of tabs on each of the housing halves bent perpendicular to the plane of the housing halves with at least one tabe of each housing half assuming a predetermined position relative to the pole system of the repsective housing half and wherein when the housing halves are fitted together, the lateral edges of the tabs of one are pressed against the tabs of the other at least in part.

2. A housing according to claim 1 wherein the length of the tabs is shorter than the axial housing height.

3. A housing according to claim 1 wherein the two housing halves are identical.

4. In a housing for a fractional horsepower A-C motor of the type comprising two housing halves of the same diameter which are fitted together with each housing half containing poles forming a pole system for the A-C motor, an improved form of construction, comprising a plurality of tabs on each of the housing halves bent perpendicular to the plane of the housing halves with at least one tab of each housing half assuming a predetermined position relative to the pole system of the respective housing half and wherein alternative tabs on each half are wider and contain a slot with the remaining tabs being narrow and of a width corresponding to the width of said slots in said wider tab.

5. A housing according to claim 4 wherein said slot is wider at the base of the tab.

6. A housing according to claim 4 wherein the length of tabs is shorter than the axial housing height.

7. A housing according to claim 4 wherein the two housing halves are identical.

* * * * *

UNITED STATES PATENT AND TRADEMARK OFFICE
CERTIFICATE OF CORRECTION

PATENT NO. : 3 916 228
DATED : October 28, 1975
INVENTOR(S) : Friedrich Knürr et al It is certified that error appears in the above-identified patent and that said Letters Patent are hereby corrected as shown below:

Column 2, line 30, change "FIG.3" to read --FIG.2--

Column 3, line 15, delete "fractiinal" to read --fractional--

Signed and Sealed this thirteenth Day of April 1976

[SEAL]

Attest:

RUTH C. MASON
*Attesting Officer*

C. MARSHALL DANN
*Commissioner of Patents and Trademarks*